United States Patent [19]
Seiberlich

[11] 3,823,641
[45] July 16, 1974

[54] GEAR SHAPING APPARATUS WITH MEANS FOR LIFTING CUTTER WHEEL RELATIVE TO THE WORK PIECE

[75] Inventor: Walter Seiberlich, Ettlingen/Baden, Germany

[73] Assignee: Maschinenfabrik Lorenz AG, Ettlingen/Baden, Germany

[22] Filed: Sept. 27, 1972

[21] Appl. No.: 292,800

[30] Foreign Application Priority Data
Sept. 30, 1971  Germany.......................... 2148801

[52] U.S. Cl. ..................................................... 90/7
[51] Int. Cl. ............................................... B23f 5/16
[58] Field of Search .......................... 90/7, 8, 9, 10

[56] References Cited
UNITED STATES PATENTS
| | | | |
|---|---|---|---|
| 2,125,304 | 8/1938 | Miller | 09/7 |
| 2,125,873 | 8/1938 | Aeberli | 90/7 |
| 2,129,858 | 9/1938 | Miller | 90/7 |

Primary Examiner—Andrew R. Juhasz
Assistant Examiner—Z. R. Bilinsky
Attorney, Agent, or Firm—Larson, Taylor and Hinds

[57] ABSTRACT

In a gear shaping apparatus, an arrangement for moving a cutter wheel spindle relative to the work piece between a cutting stroke path and either of two return stroke paths on either side of the cutting stroke path. Adjacent a pair of contact surfaces movable with the spindle is a cam rotatable synchronously with the axial spindle movement and mounted on an eccentric shaft which is mounted in the machine frame, such that turning of the eccentric shaft brings the cam to one or the other of the contact surfaces to move the spindle either between the cutting stroke path and one return stroke path or between the cutting stroke path and the other return stroke path, respectively. The cam generally moves the spindle to the cutting stroke path and each of a pair of opposed return means such as for example a spring are made operable to move the spindle to one or the other of the return stroke paths, respectively, to lift the cutter wheel relative to the work piece for the return stroke.

16 Claims, 13 Drawing Figures

GEAR SHAPING APPARATUS WITH MEANS FOR LIFTING CUTTER WHEEL RELATIVE TO THE WORK PIECE

BACKGROUND OF THE INVENTION

This invention relates to gear shaping apparatus, and in particular it relates to a new and improved arrangement for lifting the cutter wheel relative to the work piece in such an apparatus.

In such an apparatus, the cutter wheel is normally mounted on a spindle which reciprocates axially and the work piece is mounted on a table which does not move axially for the cutting strokes. Of course it will be understood that the reverse is also true. For convenience, the following description and claims will describe the conventional arrangement with the cutter wheel on the spindle. However, it will be understood that this also includes the said reverse arrangement.

In the case of shaping by the generating method, the processing of a revolving work piece takes place by means of a rotating cutter tool in most cases developed similar to a gear, the so-called cutter wheel, which is fed radially up to an axial distance from the work piece, determined in the case of outside toothings by the sum of or in the case of inside toothings by the difference between the radii of the pitch circles. Naturally, it is also possible to feed inversely the work piece to the cutter wheel. The work piece and cutter wheel are connected with a transmission ratio by way of a gear train, the ratio being equal to the ratio of the r.p.m.'s or the reciprocal value of the number of teeth or the radii of the pitch circles of the work piece and the cutter wheel. In the case of known gear shapers the rolling movement between the cutter wheel and the work piece is produced via a rolling mechanism train with a fixed gear ratio, namely, the two worm gears, by way of which the cutter wheel and work piece are driven as well as gear mechanisms required from the point of view of construction, such as pairs of bevel gears, etc., and inclusive of change gears.

For production of the rolling profile on the work piece, axial double stroke movements are imparted to the cutter wheel. The cutting and the return stroke are adjustable on a cam plate corresponding to the width of the toothing of the work piece. During the cutting strokes, the raw material of the tooth spaces of the work piece is machined with a simultaneous rotation, also referred to as generating of the cutter wheel on the work piece. Both downward outward movement from top to bottom as well as upward inner movement from bottom to top can be used as the cutting stroke, assuming that a gear shaper with a vertical cutter wheel axis and work piece axis is used. The return strokes in that case run correspondingly in an inverse direction. Whenever the cutting stroke acts from top to bottom, then this production process is called "shaping." The inverse cutting in the upward direction is called "drawing." For the duration of the return stroke following each cutting stroke, the cutter wheel is lifted off the work piece or, vice versa, the work piece is lifted off the cutter wheel, so that the cutter wheel can be returned without contact with the work piece. This lifting off movement takes place, depending on the manner and shape of the toothing that is to be produced, in the direction of the connecting line between the center of the cutter wheel and the work piece or at an angle to this line and is imparted either by way of proper control of the cutter wheel spindle or work piece spindle to the cutter wheel or the work piece.

There are various production procedures including cutting inside or outside toothings and performing either by either shaping or drawing. Each of these procedures requires a corresponding change in the direction of movement of the cutter wheel during the lifting. Gear shapers are known (published German Application P 1627 370), in which case a cam which imparts the lifting movement to the cutter wheel or to the work piece by way of proper intermediate machine elements must be changed for each procedure.

In the case of other gear shapers known in practice, two cams are provided which are made operable for each procedure by means of a complicated lever system.

Thus, it will be seen, in an apparatus adapted to cut either outside gear teeth or inside gear teeth, and to cut each either by drawing or shaping, it has been quite complicated heretofore to change over this machine for the different lifting movements required for the return stroke in each of these four procedures. It was necessary either to change parts or it was necessary to utilize a complicated or expensive arrangement including many levers and the like for effecting the necessary modification for lifting off in each of the four above described modes of operation.

SUMMARY OF THE INVENTION

Thus, it is a purpose of this invention to provide a new and improved gear shaping apparatus in which the above described disadvantages are overcome and there is provided instead a gear shaping apparatus having an improved and simplified arrangement for effecting lifting movement of the cutter wheel relative to the work piece for each of the various modes of operation of the machine.

This purpose of the invention is achieved by providing an arrangement wherein a main cam referred to also as a clearing cam is rotatable synchronously with the reciprocating movement of the cutter wheel spindle and is mounted on the machine frame for movement between a first location where it controls the cutting stroke and permits one return stroke, and a second location whereat the main cam also controls the cutting stroke but permits movement of the spindle to a return stroke position different from the first said return stroke position. While the cam is "permitting" the spindle to assume either of the said return stroke positions, a suitable return means such as a spring means or the like is provided for effecting such movement to the return stroke positions. In either of said locations, the phase angle of this cam can be changed so that either drawing or shaping can be accomplished in either of the two said positions of the main cam. This main cam is mounted on a shaft disposed adjustably between a pair of contact surfaces and movable against either one of them. In a preferred arrangement, this cam will be mounted on an eccentrically mounted shaft which may be turned to bring the main cam into operative engagement with either of the said contact surfaces. These contact surfaces are in turn mounted for movement with the spindle between said stroke positions.

There is also provided a counterpressure means such as spring means for urging the spindle to one or the other of the return stroke positions when permitted to do so by the main cam. In a preferred arrangement, this counterpressure means may take the form of springs acting between the spindle and the frame and having a pair of operable positions, each of which corresponds to one of said locations of the main cam. In a preferred arrangement, a shaft fixed to the frame has an eccentric part thereon extending into a recess within the spindle, and springs mounted in the spindle engage opposite sides of this eccentric part. This latter shaft is then turned to bring the eccentric part into operative engagement with one or the other of springs located on opposite sides thereof.

Suitable cam drums operating terminal switches may be mounted on the eccentric shaft associated with the main can and/or the eccentric shaft associated with the springs for controlling operation of the gear shaping apparatus.

BRIEF DESCRIPTION OF THE DRAWINGS

There follows a detailed description of preferred embodiments of the invention to be read together with the accompanying drawings in which:

In FIG. 1, the section lines II—II and IIa—IIa are actually one and the same. However, the section line IIa is shown raised in FIG. 1 to illustrate this portion of the actual section line II—II more clearly.

FIG. 6 shows the adjustment and application of the invention for the production of an outside toothing by shaping.

FIG. 7 shows the procedure according to FIG. 6 during the return stroke of the cutter wheel spindle.

FIG. 8 shows the adjustment and application of the invention for production of an outside toothing by drawing.

FIG. 9 shows the procedure of FIG. 8 during the return stroke of the cutter wheel spindle.

FIG. 10 shows the adjustment and application of the invention for production of an inside toothing by shaping.

FIG. 11 shows the procedure of FIG. 10 during the return stroke of the cutter wheel spindle.

FIG. 12 shows the adjustment and application of the invention for production of an inside toothing by drawing.

FIG. 13 shows the procedure of FIG. 12 during the return stroke of the cutter wheel spindle.

DETAILED DESCRIPTION OF THE PREFERRED EMBODIMENTS

Figure 1:
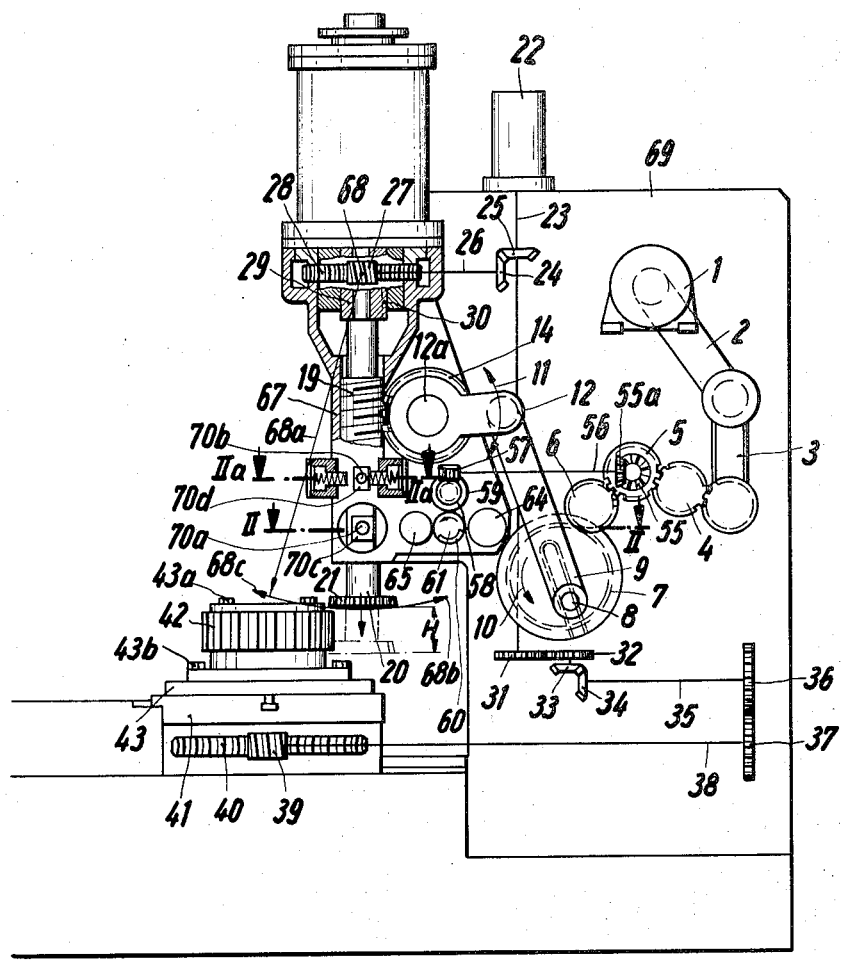
FIG. 1 is a longitudinal sectional view through the gear shaper according to the present invention.

Referring now to the drawings, like elements are represented by like numerals throughout the several views.

Referring to FIG. 1, the driving motor 1 drives a cam plate 7 via a belt drive 2, a continuous cone plate looping gear mechanism 3 and intermediate gears 4, 5, 6.

A connecting rod 9 is coupled with this cam plate by means of a crank pin 8, which rod transforms the rotational movement 10 to an oscillating circular movement 11 of a rocker arm 12 mounted on an axle 12a. The latter is connected firmly and rotatably with a lifting wheel 14.

The toothing of the lifting wheel 14 engages with a corresponding annular toothing 19 of a cutter wheel spindle 20, on which a cutter wheel 21 is attached. The latter is moved by way of driving elements 7, 8, 9, 12, 14 into a reciprocating axial double stroke movement H, as a result of which during the cutting stroke, also referred to as the operating stroke, the raw material of the tooth spaces of a work piece 42 is machined with simultaneous hobbing of the cutter wheel 21 on the work piece 42.

This generating movement of cutter wheel 21 and work piece 42 is introduced in the illustrated embodiment by means of a motor 22. Its rotational movement is transferred by means of a shaft 23, with which a bevel gear 24 is tortionally connected. Another bevel gear 25 engages with bevel gear 24. The rotational movement continues via a shaft 26 and a worm 27, which on its part engages with a worm gear 28. The latter, together with a casing 29, constitutes a driving element. The rotational movement is transmitted by means of an axis parallel spline or a helical guide 30 to the cutter wheel spindle 20.

The rotational movement is transmitted via the shaft 23 by way of a pair of spur gears 31/32, a pair of bevel gears 33/34, a shaft 35, speed change gears 36/37, a shaft 38 and a worm gear 39/40 also to a work piece spindle carrying work piece 42 or a work table 41 bearing the work piece. The work piece 42 is connected by way of a chucking arrangement 43 and by means of screws 43a and 43b with work table 41 for the work piece. The gear ratio of the gear train between the cutter wheel spindle 20 and work table 41 for the work piece, corresponding to the ratio of the number of teeth between the cutter wheel 21 and work piece 42, is changed from case to case by an exchange of the speed change gears.

Figure 2:
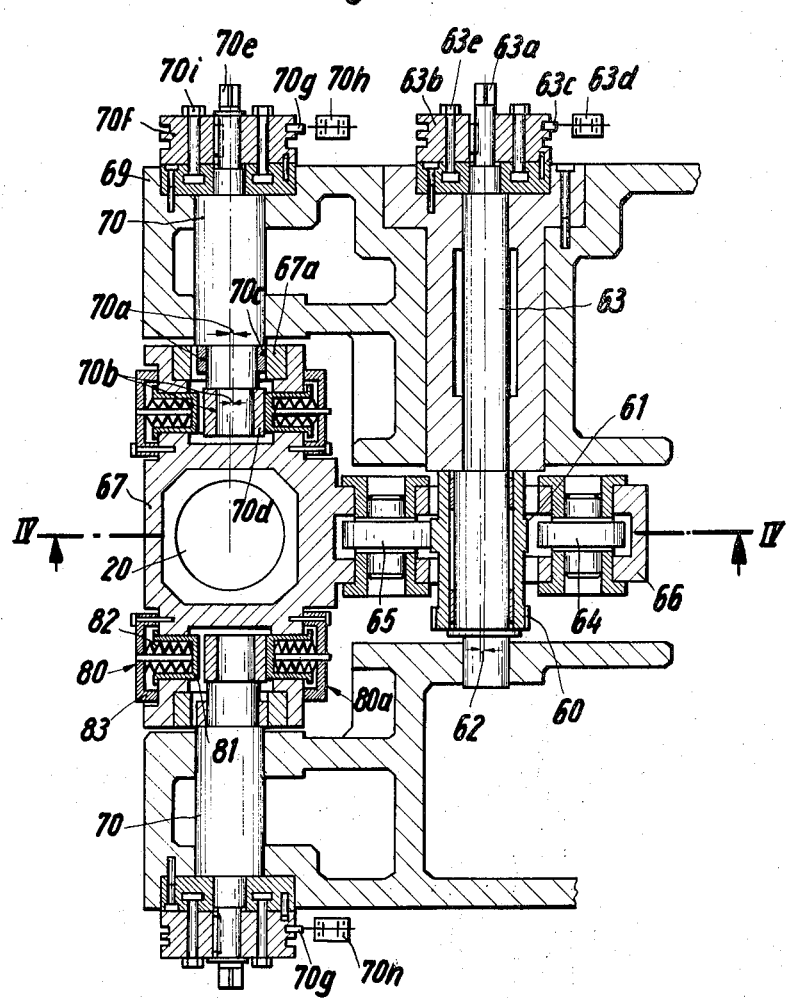
FIG. 2 is a sectional view taken along lines II—II of FIG. 1 and IIa—IIa of FIG. 1 and also FIG. II—II of FIG. 4.
Figure 3:
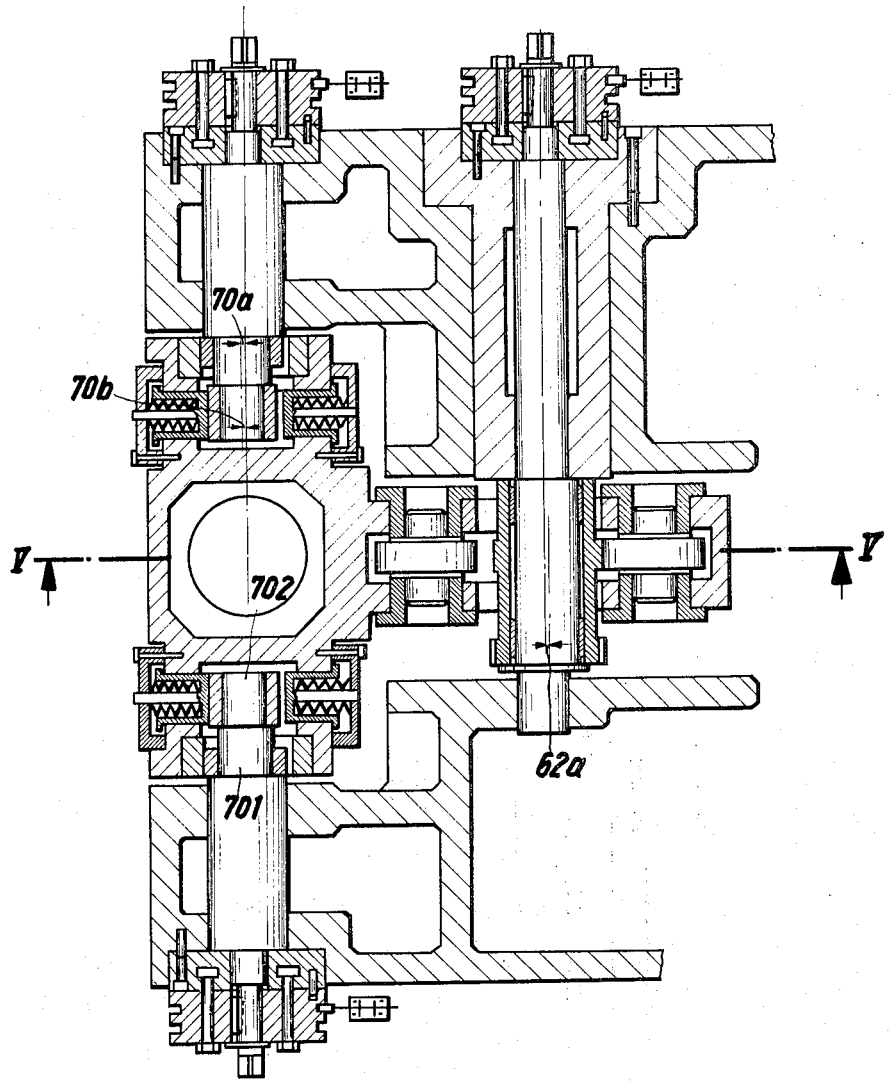
FIG. 3 is a sectional view similar FIG. 2, taken along lines II—II and IIa—IIa of FIG. 1, but also taken alone line III—III of FIG. 5. This view differs from FIG. 2 in that the parts are shown in a different operating position.
Figure 4:
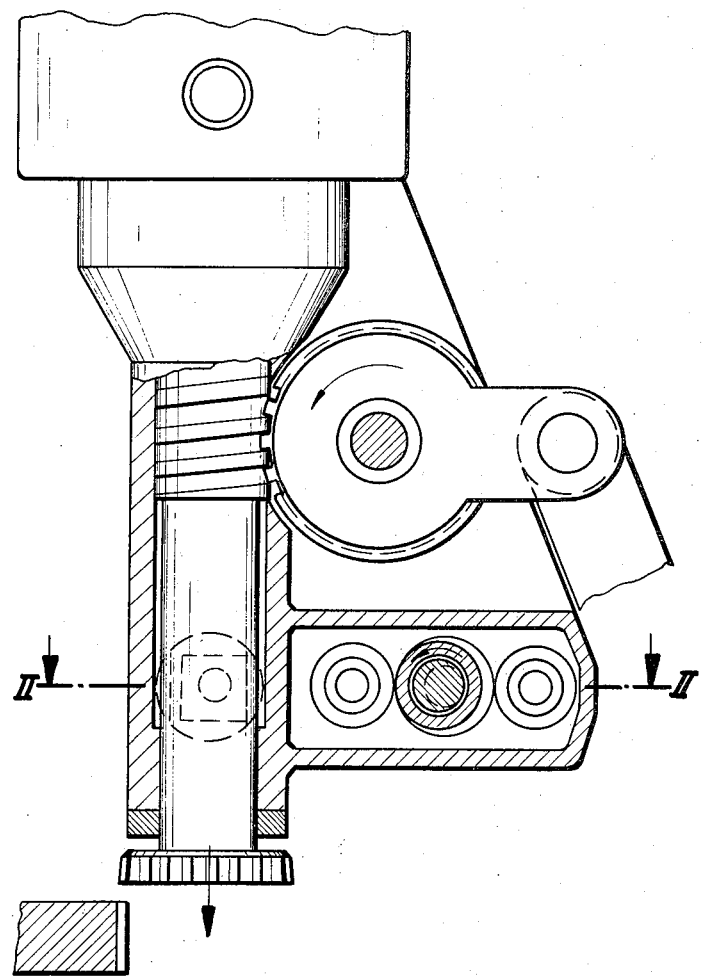
FIG. 4 is a partial sectional view taken along line IV—IV of FIG. 2.
Figure 5:
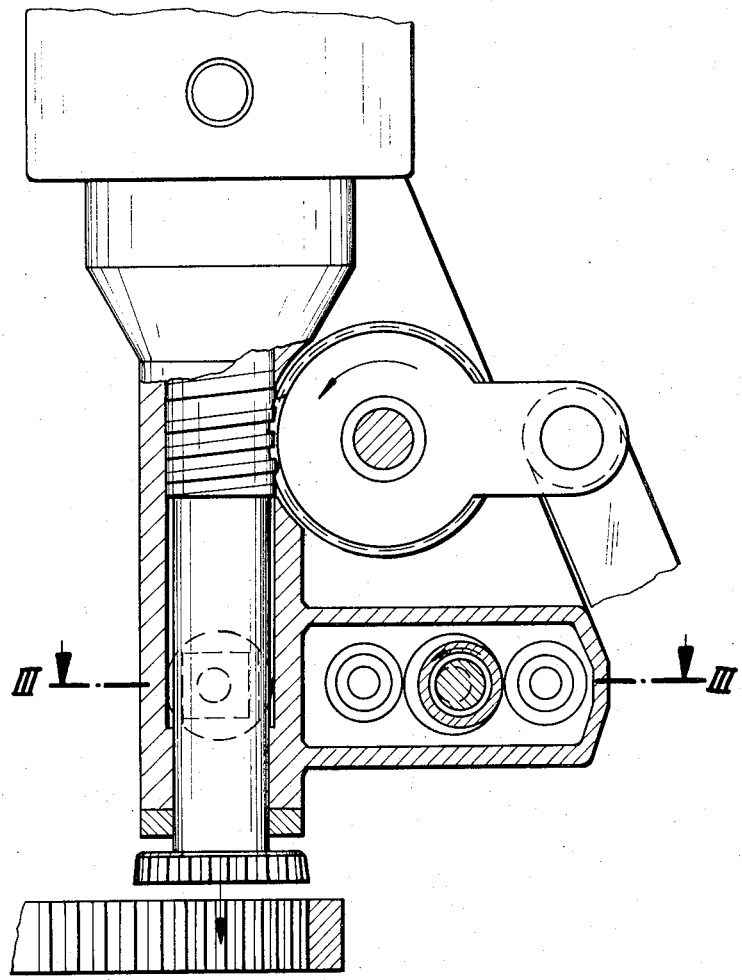
FIG. 5 is a partial sectional view taken along line V—V of FIG. 3.

A bevel gear 55 is connected with the intermediate gear 5, which bevel gear drives a worm gear 57/58 by way of another bevel gear 55a and a shaft 56. Said worm gear transmits the rotational movement to a spur gear 59. The latter engages with still another spur gear 60, which is developed in one piece with a main clearing cam 61 (FIG. 2) or is connected firmly with such a cam. The transmissions of the gear trains are so designed that cam plate 7 and main clearing cam 61 run synchronously. The main clearing cam 61 has a first concentric path along its periphery with a long radius 61a (see FIG. 6) which extends over approximately 180° and it has a second concentric path along the other 180° of its periphery with a short radius 61b (FIG. 7). The part constituting spur gear 60 and clearing cam 61 is mounted on a shaft 63 displaced eccentrically by an amount 62 (FIG. 2). By turning said shaft 180°, this eccentricity can be brought into the opposite position 62a (FIG. 3). As a result, clearing cam 61 comes to fit alternately either against a first contacting surface in the form of roller 64 or a second contacting surface in the form of a roller 65. Shaft 63 is provided with a square key 63a. In addition a cam drum 63b is keyed onto it, on which shifting cams 63c can be adjustably attached. The latter cooperate with terminal switches 63d. After adjustment to the desired position of eccentric 62/62a, shaft 63 is fastened to the machine frame, designated as 69, by means of screws 63e and by way of cam drum 63b. Rollers 64/65 are mounted in an arm 66 of the spindle mounting head 67 of the machine. The spindle mounting head serves for the mounting of the cutter wheel spindle 20 with the driving elements 27, 28, 29, 30, 12, 14 and is mounted swivelably on machine frame 69 around a point 68 (the mounting is not shown), whereby cutter wheel 21 swings around a radius 68a. Movement of the cutter wheel away from the spindle is very slight, perhaps 0.5 millimeters. Hence, sufficient tolerance can be maintained between the elements 14 and 19 to assure continuous driving engagement therebetween during movement of the spindle about the axis 68 in either direction. Moreover, since the turning movement of the worm gear 27 is very slight, the tolerance in its spline connection to shaft 26 will permit the necessary movement of this element 27 while the latter remains properly engaged with gear 28.

In machine frame 69, furthermore, two shafts 70 are mounted opposite each other in regard to the cutter wheel spindle 20 (FIG. 2). These shafts each time bear two eccentric parts 701 and 702 on their ends projecting into a recess in spindle mounting head 67, one of these parts being displaced relative to shaft 70 by the eccentricity 70a and the other by the eccentricity 70b. On eccentric part 701 an intermediate element 70c is mounted and an intermediate element 70d is mounted on eccentric part 702. The intermediate pieces 70c, depending on the position of the eccentric 701, act directly on spindle mounting head 67 by way of stop elements 67a. The intermediate pieces 70d, depending on the position of eccentric 702, come into contact with opposing spring pressure devices 80 or 80a. Each of the latter consists of a bushing 81, which is pressed against the intermediate piece 70d mounted on eccentric part 702 by means of packet 82 of plate springs that are supported by the lid 83 screwed onto the head 67. Shafts 70 are provided with a square key 70e. In addition, cam drums 70f have been keyed on, on which shifting cams 70g can be attached adjustably. The latter cooperate with the terminal switches 70h. After adjustment to the required position of the eccentrics 701 and 702, shafts 70 are braced to the machine frame 69 by means of screws 70i via cam drums 70f. By the proper adjustments of eccentrics 62, 62a, 70a and 70b it is also possible to align the axis of cutter wheel spindle 20 relative to the axis of the work piece within small limits.

The method of operation of the lifting arrangement is as follows. Referring first to the adjustment of the cams according to FIG. 2, clearing cam 61 is positively connected with roller 65 by way of its long radius 61a. (See also FIGS. 6 and 8). When clearing cam 61 is turned about 180°, the short radius 61b comes into positive contact with roller 65, and the spring pressure apparatus 80a presses the spindle mounting head 67 in direction 68b, as a result of which the cutter wheel is lifted off the work piece or, vice versa, the work piece off the cutter wheel (see also FIGS. 7 and 9).

The method of operation of the lifting arrangement in the case of adjustment of the cams according to FIG. 3 is as follows. Clearing cam 61 engages with roller 64 by way of its long radius 61a (see also FIGS. 10 and 12). In the case of turning clearing cam 61 by about 180°, the short radius 61b comes into positive contact with roller 64 and the spring pressure apparatus 80 presses head 67 in direction 68c, as a result of which the cutter wheel is lifted from the work piece or, vice versa, the work piece from the cutter wheel (see also FIGS. 11 and 13).

Figure 6:
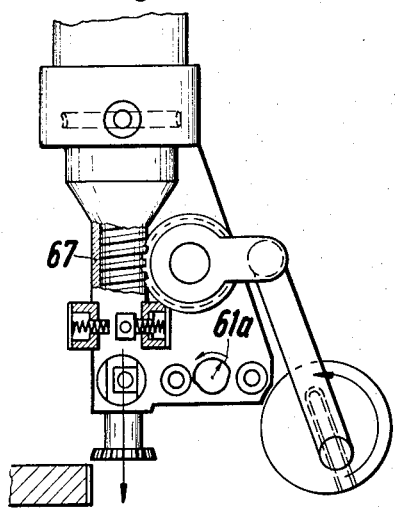
FIGS. 6—13 are partial views of FIG. 1 showing the operation of the invention. Specifically.
Figure 7:
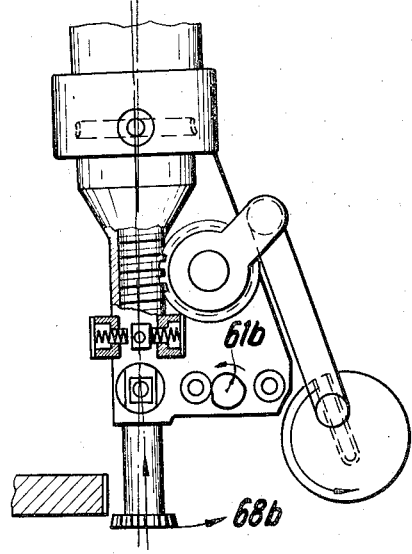
Figure 8:
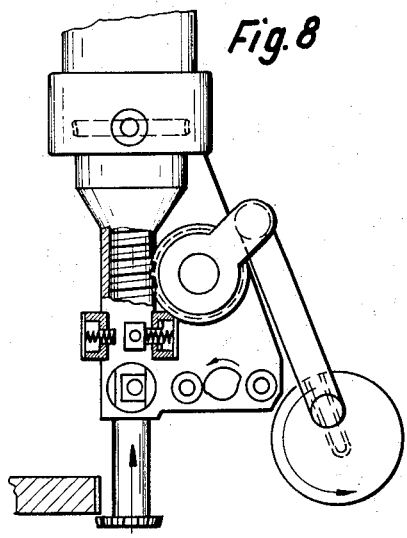
Figure 9:
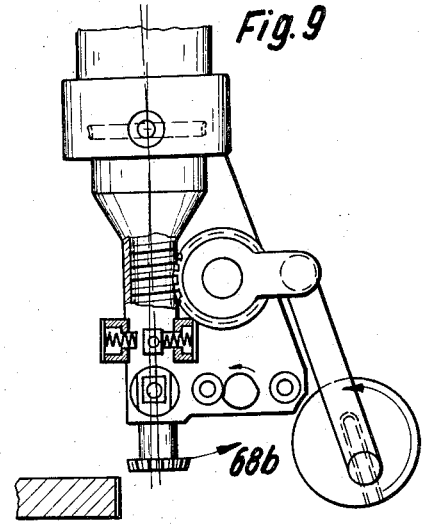

FIGS. 6, 7, 8 and 9 show the production of an outside toothing and FIGS. 6 and 7 showing shaping (cutting on the downstroke), and FIGS. 8 and 9 showing drawing (cutting on the upstroke). The lifting arrangement according to the invention is adjusted in this case according to FIG. 2, i.e., the eccentric of shaft 63 is in position 62 and the eccentrics 701 and 702, relative to FIG. 1, are adjusted fixedly in their righthand position. The difference in the adjustment of the gear shaper for shaping and drawing is accomplished by a phase adjustment of cam 61 which is accomplished turning clearing cam 61 by 180° by way of a claw clutch, operated electrically (not shown), through which for example spur gear 59 can be uncoupled, i.e., can be detached from its drive (see FIGS. 6 and 8).

Figure 10:
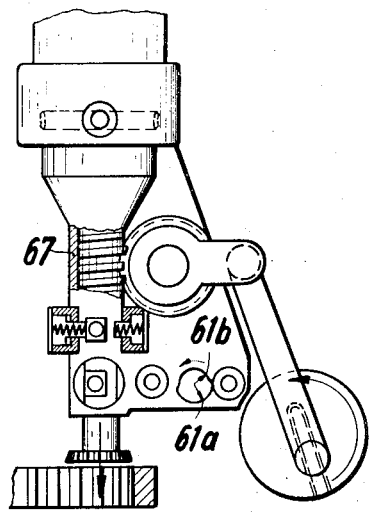
Figure 11:
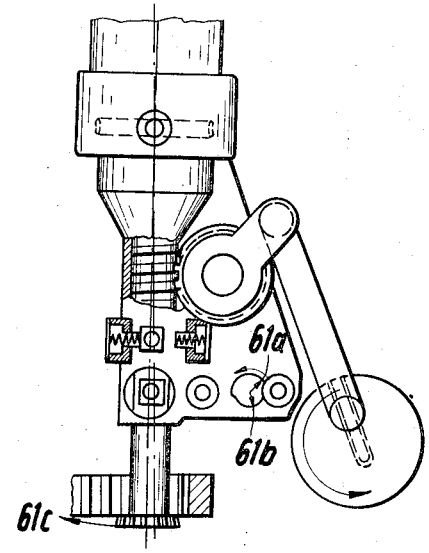
Figure 12:
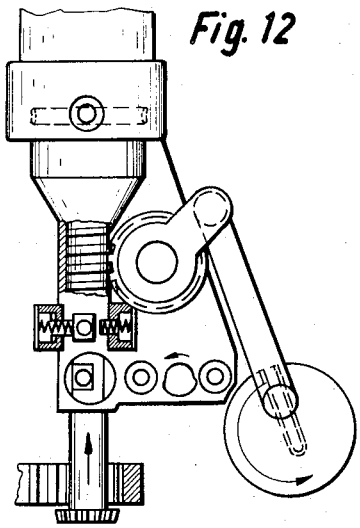
Figure 13:
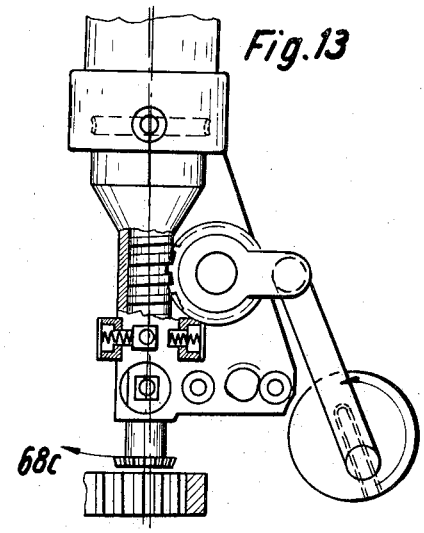

FIGS. 10, 11, 12 and 13 show production of an inside toothing and, of course, FIGS. 10 and 11 by shaping and FIGS. 12 and 13 by drawing. The lifting arrangement according to the invention in this case is adjusted according to FIG. 3, i.e., the eccentric of shaft 63 is adjusted in position 62a and eccentrics 701 and 702, relative to FIG. 1, are fixedly adjusted in their lefthand position. The difference in the adjustment of the gear shaper for shaping and drawing cuts is again brought about by a phase adjustment of cam 61 which is accomplished turning clearing cam 61 by 180° by way of a non-illustrated electrically operated claw clutch (see FIGS. 10 and 12).

The adjustments of clearing cam 71 (by way of the above mentioned claw clutch) conditioned by the various processes of production of outside and inside toothings in shaping or drawing cut, the adjustments of the eccentrics of shaft 63 and of eccentrics 701/702 are covered by the corresponding positions of the switching cams 63c and 70g.

In the electric circuit of the gear shaper, the connections of the impulses required for the production processes described are correspondingly pre-programmed by terminal switches 63d and 70h. The gear shaper can be put into operation only when the adjustment of clearing cam 61, the eccentric of shaft 73 and the eccentrics 701/702, which are recorded and controlled by the above mentioned terminal switches, corresponds to the preselected production process. Such circuits are known and do not need to be described in detail here.

Although the invention has been described in considerable detail with respect to the preferred embodiments thereof, it will be apparent that the invention is capable of numerous modifications and variations apparent to those skilled in the art without departing from the spirit and scope of the invention as defined in the claims.

I claim:
1. A gear shaping apparatus comprising:
   a frame;
   a cutter wheel mounted on a spindle;
   means for mounting said spindle in the frame for reciprocal axial movement in a first direction and an opposite second direction, wherein the cutter wheel cuts a work piece which is to be shaped into a gear during a cutting stroke of the cutter wheel in one of said axial directions and is cleared from the work piece for a return stroke in the other direction, said cutter wheel selectively cutting the work piece in either the said first direction or the said second direction, and said spindle being selectively angularly movable relative to the frame between a cutting stroke position and either one or another of two return stroke positions which are located on opposite sides of the cutting stroke position;

a stroke positioning means for angularly positioning the spindle during a given cycle of operation in either the cutting stroke position or the selected one of said one or another of said return stroke positions, said stroke positioning means including a main cam rotatable in timed relation with the reciprocating movement of the spindle and having first and second surfaces, said main cam operatively engaging the spindle mounting means such that when the first surface engages the spindle mounting means, it positions the spindle angularly for the cutting stroke, and when the second surface engages the spindle mounting means, it permits the spindle to move angularly to the said selected one of said one or another return stroke positions;

a return means for urging the spindle angularly to the selected one of the said one or another return stroke positions when the main cam second surface engages the spindle mounting means;

a cam adjusting means for varying the position of the main cam between a first cam location at which the return means urges the spindle to said one return stroke position and a second cam location at which the return means urges the spindle to the said other return stroke position;

a return adjusting means for selectively adjusting the return means between a first position to urge the spindle to the said one return stroke position when the main cam is in the said first location and a second position to urge the spindle to the said other return stroke position when the main cam is in the said second cam location, and a phase adjusting means for selectively adjusting the phase of the main cam relative to the spindle reciprocal movement to make either of said first or second axial directions of the spindle be the cutting stroke and the other the return stroke at either of said main cam locations.

2. A gear shaping apparatus according to claim 1, said spindle mounting means including a pair of contacting surfaces, said main cam located adjacent the contacting surfaces, said cam adjusting means including means for moving the main cam into operative engagement with either one of the contacting surfaces.

3. A gear shaping apparatus according to claim 2, said return means including a pair of springs which act in opposite directions between the frame and the spindle mounting means, said return adjusting means including means for moving either one of said pair of springs into its operative position to urge the spindle to one or the other of said return stroke positions.

4. A gear shaping apparatus according to claim 3, including, in addition to said spring return means, a pair of fixed stops positionable to rigidly terminate movement of the spindle mounting means to either of said return stroke positions.

5. A gear shaping apparatus according to claim 4, including a return shaft mounted in the frame and having an eccentric part extending into a recess in the spindle mounting means, said pair of fixed stops constituted by opposite sides of this recess engaging opposite sides of said eccentric part.

6. A gear shaping apparatus according to claim 3, including a return shaft mounted in the frame and having an eccentric part extending into a recess in the spindle mounting means, said pair of springs mounted in the spindle mounting means and extending into the said recess, one on each side of the eccentric part of the return shaft, wherein the return shaft is turnable to place its eccentric part into operative engagement with either of said springs, one of said springs cooperating with the first location of the main cam and the other spring cooperating with the second location of the main cam.

7. A gear shaping apparatus according to claim 6, said return shaft being keyed together with a drum having cams thereon which, depending on the angular position of the return shaft, operates electrical controls of the gear shaping apparatus.

8. A gear shaping apparatus according to claim 6, wherein the said springs are supported by counterpressure surfaces fixed with the spindle mounting means and are disposed in receiving bushings closed at their ends opposite from the counterpressure surfaces, said bushings being guided movably in the spindle mounting means relative to the said counterpressure surfaces by length of the maximal spring path, the ends of the bushings opposite from the counterpressure surfaces being adapted to engage the said eccentric part.

9. A gear shaping apparatus according to claim 8, wherein each of said pair of springs are constituted by a packet of plate springs.

10. A gear shaping apparatus according to claim 6, said return shaft including a second eccentric part thereon extending into the recess, fixed stop means fixed on the spindle mounting means and cooperating with the second eccentric part to provide a separate stop corresponding to each of said main cam locations.

11. A gear shaping apparatus according to claim 6, said main cam mounted on an eccentric shaft which is adjustably mounted on the frame to place the main cam into either of said first or second locations.

12. A gear shaping apparatus according to claim 11, said contacting surfaces being a pair of rollers, the axes of which are parallel and spaced apart from each other a distance greater than the maximum diameter of the main cam, the main cam located between these rollers, wherein in the said first location the main cam operatively engages one roller and in the said second location the main cam operatively engages the other roller.

13. A gear shaping apparatus according to claim 2, wherein said main cam is mounted on an eccentric shaft which is adjustably mounted on the frame to place the main cam into either of said first or second locations.

14. A gear shaping apparatus according to claim 13, wherein said contacting surfaces and the movable part of said return means are mounted on the spindle mounting means to move therewith during movement of the cutter wheel between the said cutting and return stroke positions and said main cam and a fixed reaction part of the return means are mounted in said frame.

15. A gear shaping apparatus according to claim 13, the eccentric shaft being keyed together with a shifting cam drum having shifting cams thereon, the angular positions of which represent the angular position of the eccentric shaft to thus provide means for controlling electrical controls of the gear shaping apparatus.

16. A gear shaping apparatus according to claim 2, said contact surfaces and the movable part of said return means being mounted on the spindle mounting means to move therewith during movement of the cutter wheel between said cutting and return stroke positions and said main cam and a fixed reaction part of the return means being mounted in said frame.

* * * * *